United States Patent [19]

Kitamura

[11] Patent Number: 5,835,375
[45] Date of Patent: Nov. 10, 1998

[54] INTEGRATED MPEG AUDIO DECODER AND SIGNAL PROCESSOR

[75] Inventor: John Kitamura, Toronto, Canada

[73] Assignee: ATI Technologies Inc., Unionville, Canada

[21] Appl. No.: 581,903

[22] Filed: Jan. 2, 1996

[51] Int. Cl.⁶ .................................................. G06F 17/00
[52] U.S. Cl. ................. 364/400.01; 704/500; 704/503; 386/96; 386/104; 386/109; 386/112
[58] Field of Search .................................. 382/250, 233, 382/232; 386/96, 109, 112, 104; 348/398, 403, 404, 405, 845; 364/400.01, 715.02, 724.05; 395/2.14, 2.91, 2.92, 2.94, 2.95, 2.15; 704/200, 201, 203, 205, 206, 500, 501, 502, 503

[56] References Cited

U.S. PATENT DOCUMENTS

| | | | |
|---|---|---|---|
| 5,508,949 | 4/1996 | Konstantinides | 364/725 |
| 5,574,565 | 11/1996 | Strolle | 386/81 |
| 5,623,423 | 4/1997 | Lipovski | 364/514.12 |

*Primary Examiner*—Emanuel Todd Voeltz
*Assistant Examiner*—Demetra R. Smith
*Attorney, Agent, or Firm*—E. E. Pascal; R. A. Wilkes; H. C. Baker

[57] ABSTRACT

A method of reconstructing a stream of digital frequency domain audio signal samples into audio signals comprising parsing the stream of samples and reconstructing subband data in the frequency domain, processing the subband data to obtain a processed frequency domain digital audio signal, and constructing a time domain audio output signal from the processed frequency domain digital audio signal.

10 Claims, 2 Drawing Sheets

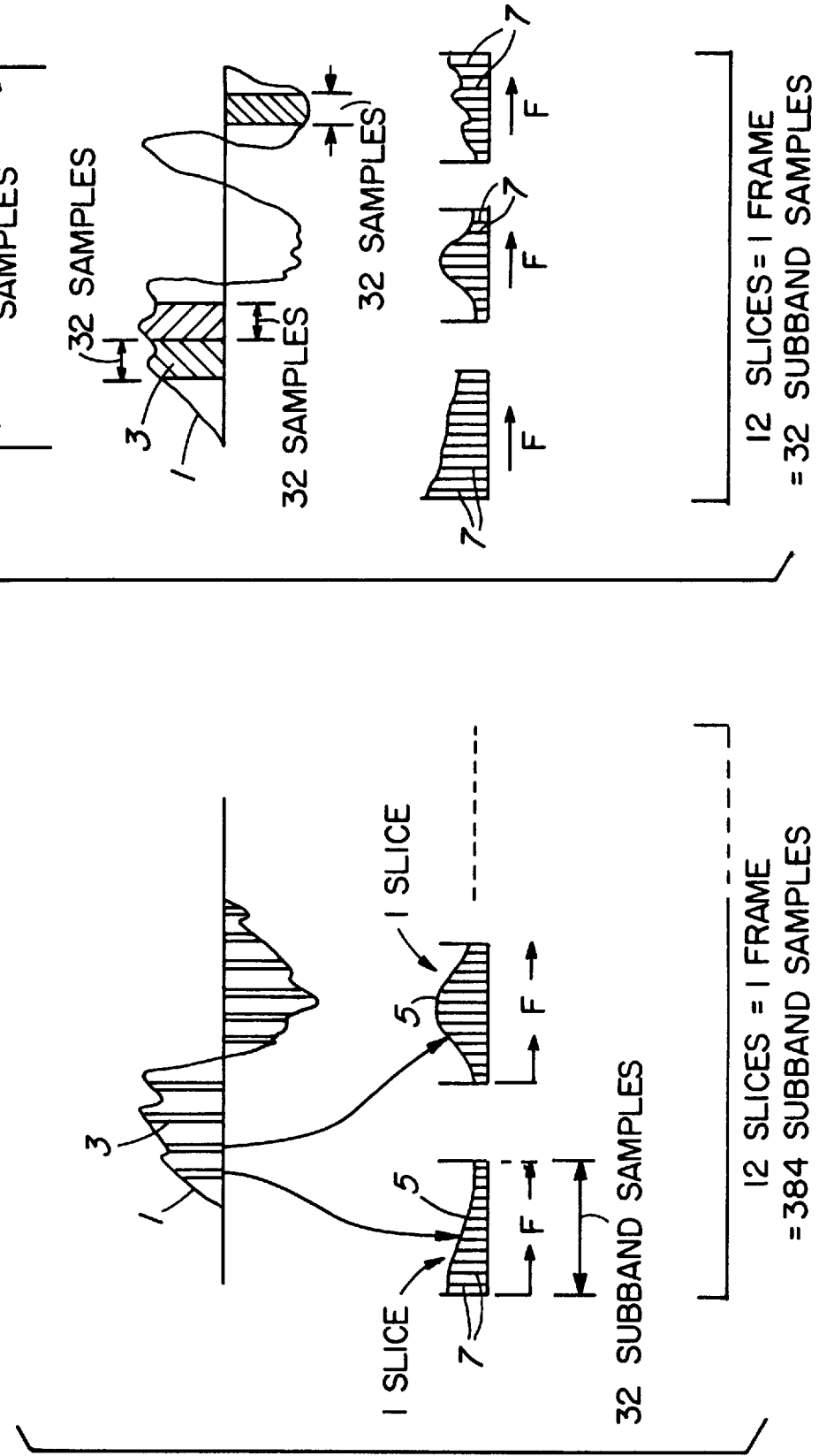

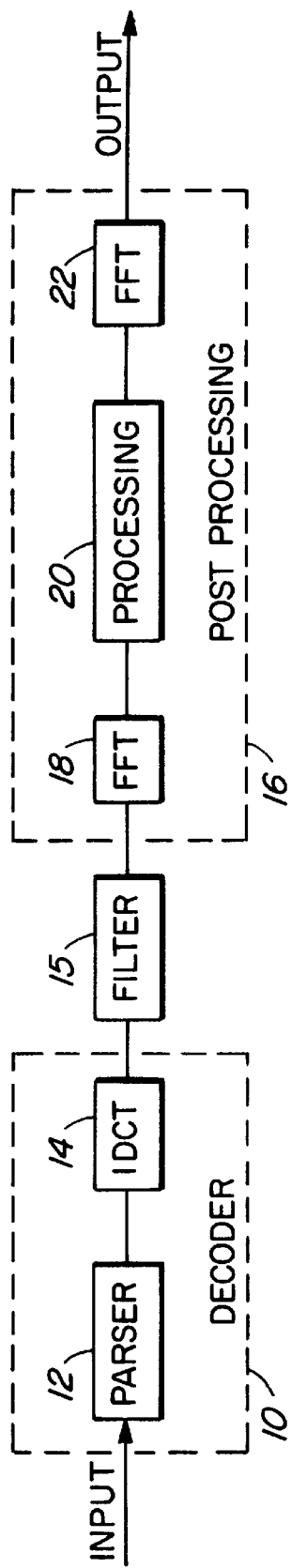
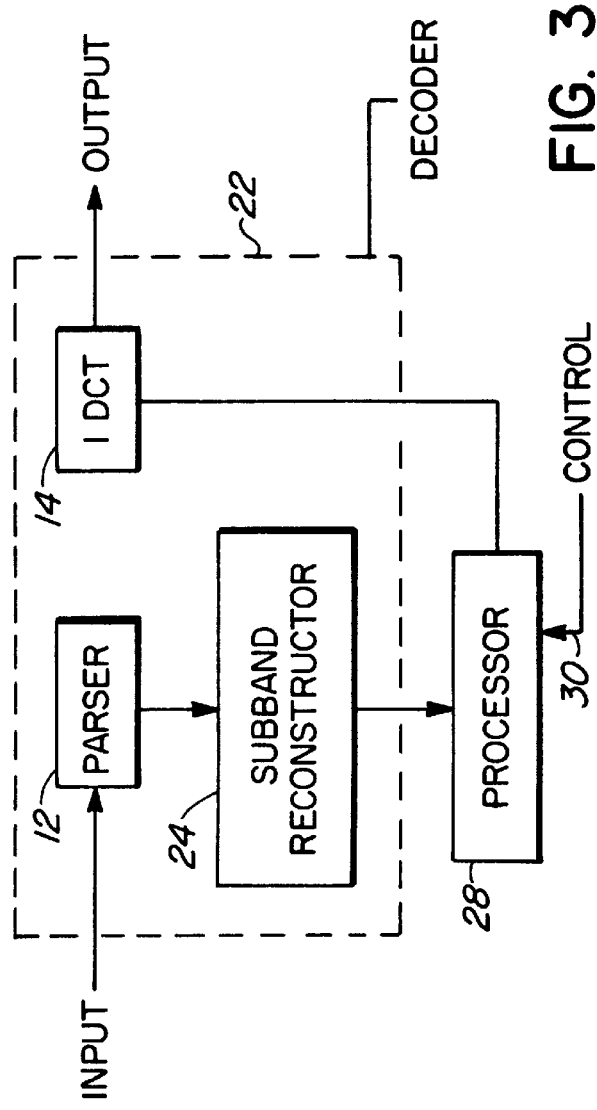

INTEGRATED MPEG AUDIO DECODER AND SIGNAL PROCESSOR

FIELD OF THE INVENTION

This invention relates to the field of digital signal processing, and in particular to a method and apparatus for manipulating digital audio signals compressed and stored in the frequency domain while reconstructing them into audio signals in the time domain.

BACKGROUND TO THE INVENTION

Computer programs (applications) which cause compressed storage and reconstruction of live or rendered video and audio signals have used the MPEG standard. In accordance with this standard, time domain digital signals are converted into frequency domain signals and are stored, and the reverse occurs to reconstruct the signals. A description of the conversion and reconstruction may be found in the article entitled "Coding Of Moving Pictures and Associated Audio for Digital Storage Media At Up To About 1.5 Mbit/s", in Information Technology, Part 3; Audio, Document ISO/IEC 11172-3, 1993/08/01.

In accordance with the MPEG standards, signals containing information (data) which changes over time are stored as a series of digital values which are presented at a constant period, and are in the time domain. The information can also be stored as a sequence of blocks of information which represent the frequency components of the signals, and is in the frequency domain. Transformations from one domain to the other have been computationally expensive, and require specialized hardware to implement real-time applications. MPEG compression has thus been more expensive than time domain compression.

Currently MPEG decoders only reconstruct compressed video and audio data. If any signal processing is to be done on the data, it must be done after the data has been reconstructed. For more complex processing other than e.g. filtering, such as 3D spatialization of audio signals, there must be transformation from the time domain to the frequency domain, processing, transformation back to the time domain, and the process is repeated as many times as there are elements in the processing chain (e.g. spatializer=1 element, pitch shifter=1 element, lost frequency enhancer=1 element, etc.). Although there is no signal degradation in this process, it adds significant computational cost.

SUMMARY OF THE INVENTION

The present invention relates to a method and apparatus in which processing of the audio signals is performed following reconstruction of the frequency data from the compressed signal, but prior to conversion to the time domain. Thus the data is still in the frequency domain when the processing is performed directly on the data. It is not necessary to incur the processing cost of transformation of the data to the time domain and reconversion of the data to the frequency domain to perform complex processing of the data. The processing cost of the data is thus significantly reduced.

Reduced processing cost results in simpler hardware designs, resulting in less complexity in an ASIC and therefore less size and less cost. It also means that processor time is used which could be used to process other signals, and directly impacts the speed of throughput of data in the computer or other processor in which the processing is being performed.

In accordance with the present invention, a method of reconstructing a stream of compressed digital frequency domain audio signal samples into audio signals is comprised of parsing the stream of samples and reconstructing subband data in the frequency domain, processing the subband data to obtain a processed frequency domain digital audio signal, and constructing a time domain audio output signal from the processed frequency domain digital audio signal.

In accordance with another embodiment, an audio decoder is comprised of apparatus for receiving digital frequency domain signal samples of an audio signal and for reconstructing subband data therefrom in accordance with a predetermined standard, apparatus for increasing the resolution of the subband data, apparatus for processing the subband data having increased resolution to obtain a processed frequency domain digital audio signal and apparatus for constructing a time domain audio output signal from the processed digital audio signal.

It should be recognized that the invention is equally applicable to processing of video signals. The use of the word audio is thus intended to mean either audio or video signals, in this specification.

BRIEF INTRODUCTION TO THE DRAWINGS

A better understanding of the invention will be obtained by reading the description of the invention below, with reference to the following drawings, in which:

FIG. 1A is a diagram illustrating the conversion of frequency domain signals to time domain, FIG. 1B is a diagram illustrating the compression of time domain signals to the frequency domain, FIG. 2 is a block diagram illustrating an audio decoder in accordance with the prior art, and FIG. 3 is a block diagram illustrating an embodiment of the present invention.

DETAILED DESCRIPTION OF THE INVENTION

In FIG. 1A, an analog audio signal 1 is shown. Samples 3 of the audio signal 1 are taken at regularly spaced intervals, and using e.g. an $\mu$-law or A-law pulse code modulation scheme, the values of the signals are digitized. Using a digital fourier transform (DFT) technique, the frequency components of each sample 3 slice are digitized, and may be represented as the frequency domain curve 5, for each sample 3. In the MPEG standard, 32 samples are used to digitally define each frequency domain curve 5 of each sample. It may be seen that each sample 3 may be represented by a different frequency domain curve 5, and thus a different set of values for the 32 frequency domain samples. These sets of values are stored.

Converting data from the time domain to the frequency domain in this case is equivalent to conversion from frequency domain to time domain, as shown in FIG. 1B. That is, the 32 samples in the time domain generates 32 samples in the frequency domain. In FIG. 1, the slice "3" of data in the time domain must consist of 32 consecutive samples. Since MPEG operates on consecutive slices of 32 samples, the next slice must consist of the next 32 samples.

The MPEG decoder 10 subsystem illustrated in FIG. 2 is used to reconstruct the audio signal into the time domain. A stream of frequency domain samples (e.g. from a memory) are input to a parser 12, which parses and reconstructs the frequency information of the signal, and provides its output signal to a transformation circuit 14 (IDCT) which transforms the signal back to the time domain.

While the resulting signal can be used, in such applications as video games reuse of the same stored stream of signals has been found to be unsatisfactory to increasingly sophisticated users. For example, sound effects are stored in audio files which are played back in synchronization with activity on the display of a computer or other video game display. Often the most realistic sound effects will sound as if they are fake when used too often, because as the user gets used to the sound, he will notice that repetitions of the sound are exact copies of the original. This would never occur in a real-life situation, in which different ambiances colour the sound.

For that reason, some games randomly change the sample rate to a slight degree to give repetitive uses of the same sample a slightly different sound. However, with additional use of randomly changing filtering, reverberation and pitch, the reality of the sounds can be increased.

Placement of sound in a 3 dimensional space has been a problem because of the requirements of a high quality sound reproduction, and because such desirable sophisticated audio effects as 3 dimensional spatialization is computationally expensive, as noted above. To provide audio effects such as to 3 dimensional spatialization, the output signal of the decoder 10 has been filtered in an optional filter 15 and then has been processed by a post processor 16, such as a 3D imager. The post processor converts the filtered signal back to the frequency domain by a fast fourier transform 18, then processes the signal in a processor 20, then converts the signal back to time domain using fast fourier transform 22. The output signal from post processor 16, after transformation into the time domain, is passed through a filter and digital-to-analog converter (not shown), to analog sound reproduction circuitry.

FIG. 3 is a block diagram illustrating the decoder of the present invention. The stream of digital frequency domain signal samples is applied to parser 12 of an MPEG decoder, where the samples are parsed and subband data is reconstructed. However, it has been found that the 32 subbands of the MPEG standard typically do not have sufficient resolution to perform many desirable signal processing algorithms. Therefore it is preferred that the output signal of parser 12 should be applied to a subband reconstructor 24 in which the resolution is increased.

Subband reconstruction (resolution enhancement) is performed by taking groups of subband samples and combining them into larger blocks with increased resolution, and in which phase information is retained. The phase information should be retained since in a larger block the variance in time of a spectral component becomes more noticeable, and therefore more important.

To provide the above function, a standard discrete cosine transform (DCT), which is a version of the digital fourier transform (DFT), creates a representation of equally spaced subbands. The standard DCT is described in the article "The Discrete Cosine transform", by K. R. Rao et al, Academic Press, New York, 1990. As a fast fourier transform obtains its efficiency by decomposing a large DFT into groups of smaller DFTs, a number of DCT slices can be recomposed into a larger DCT with more resolution, but which represents a longer duration in the time domain.

A series of sequential frequency domain samples can be converted into the time domain in several ways. One way is to perform sine and cosine multiplications at different frequencies across the entire sample range (a DFT). This requires N squared multiplies. Another method, used in FETs or Fast Fourier Transforms is to break the initial range into smaller sections. The regular DFT is performed on these smaller blocks. Then terms from these blocks are multiplied by another sine or cosine function and summed together in a process known as a butterly operation. This continues N times, where the initial series was broken up into two to the power of N sections. This drastically reduces the number of multiplies needed. (Ref: Digital Signal Processing, Alan V. Oppenheimer and Ronald W. Schafer, Prentice Hall, New Jersey, 1975).

In contrast, the MPEG standard uses a modified DCT algorithm preceded by a multiband quadrature filter, as described in the article "Polyphase Quadrature Filters—A New Subband Coding Technique", by J. H. Rothweiler, Proceedings of the ICASSP 1983, Boston, pp. 1280–1283. The result of this is that slices of 32 subband (frequency domain) samples, which are the smallest component of data used in the MPEG standard, can be grouped together only with difficulty for conversion into a single high resolution block, as the components of a standard DCT would have been.

The MPEG standard specifies that either 12 or 36 slices of 32 subband samples should constitute a frame. Error detection is performed on a frame by frame basis. FIG. 1 illustrates how 12 slices of 32 subband samples in the frequency domain form a frame 26. Thus, the 12 or 36 slices are transformed in subband reconstructor 24 into a block of 384 or 1152 subband samples. Since the number of slices is not a power of 2, for standard DCTs, groups can be recomposed in stages of mutually prime numbers, which can be used for the modified DCT. In other words, the 12 slices could be recomposed in three stages (2 by 2 by 3), and 36 slices can be recomposed in four stages (2 by 2 by 3 by 3).

In accordance with the present invention, each frame of frequency domain data should be applied to a processor 28, where processing of the frequency domain data is performed to provide the complex manipulation required, that was previously provided using other means in the post processor 16. The output of the processor 28 is applied to the transformation circuit 14, for conversion into a time domain signal in the manner described with reference to the prior art.

The processor 28 can be for example a microcodable digital signal processor (DSP) which can perform a number of signal processing routines, or it can be a hardcoded or hardwired processor which performs a fixed specific function (such as a 3 dimensional spatialization module), or an adaptive filter.

A 3 dimensional spatialization technique which can be provided by the processor 28 is described in "Spacial Hearing" The Psychophysics of Human Sound Vocalization", by Jens Blauert, MIT Press, Cambridge, Mass., 1983.

It should be noted that for some designs it is desirable to be able to modify the operation of the processor 28 in time relationship with another aspect of an application, such as display of a video signal. In such cases, and input signal is provided at an external input 30, which provides a control signal for such modification.

For example, in the case of a video game in which there is a stored sample that is repeatedly used, the processor 28 has an adaptive filter, which performs a spatialization function. The compressed frequency domain information consists of a monophonic sound effect e.g. of a car engine. This is fed to processor 28 from the subband reconstructor 24. Processor 28 also accepts 3-dimensional co-ordinates through external input 30. The game application displays a video image of a race car moving around on the screen in three dimensions, and as this image moves, it sends the co-ordinates of the image to the processor 28 through the control input 30. As a result, the frequency components of the frequency domain signal applied to the processor 28 (filter) become modified in a different way for each different control signal. In this example, it modifies the monophonic input audio signal so that it appears to be placed at specific co-ordinates in three dimensions when played over headphones or stereo speakers. The image of the car moving on-screen is enhanced by the appearance of the sound of the car moving in conjunction with the visual image in three dimensional space. Also, deficiencies in the audio spatialization algorithm will be overridden by the visual feedback of the image in motion on-screen.

Since the signal is processed in processor 28 in the frequency domain, it should be noted that processor 28 can process the signal applied to it in real time to detect phonemes, detect pitch of non-polyphonic signals, perform multiband equalization, perform adaptive filtering, spatialize in 2 or 3 dimensions, etc.

The present invention can be used in teleconferencing or videophone applications to reconstruct or to enhance communication signals, or to reconstruct or enhance low bandwidth digital signals transmitted between modems. Low bandwidth MPEG audio is equivalent to telephone quality, and has a limited frequency range. This range can be artificially extended by making intelligent guesses at missing information to enhance the quality of telephone transmissions. Lost or attenuated frequencies can be enhanced.

Audio phoneme detection can be used to search for keywords of a transmitted signal. Spatialization can be used to place a voice in a room in a realistic manner.

MPEG video, as well as audio, can be processed in a similar fashion. In the frequency domain, video can undergo processing such as filtering, sharpness enhancement, edge or object detection, etc.

A person understanding this invention may now conceive of alternative structures and embodiments or variations of the above. All of those which fall within the scope of the claims appended hereto are considered to be part of the present invention.

I claim:

1. A method of reconstructing a stream of digital frequency domain audio signal samples into reconstructed audio signals comprising parsing said stream of samples and reconstructing subband data in the frequency domain, processing the subband data to obtain a processed frequency domain digital audio signal, and constructing a time domain audio output signal from the processed frequency domain digital audio signal, in which the step of reconstructing subband data in the frequency domain is comprised of first reconstructing subband data to the frequency domain from first blocks of subband samples of said stream in accordance with a first resolution, then grouping subband samples of said stream and converting them into larger blocks than said first blocks having a second resolution, higher than said first resolution, said larger blocks with said second resolution forming reconstructed subband data for said processing.

2. A method as defined in claim 1 in which the processing step is comprised of passing the reconstructed subband data through a processor means.

3. A method as defined in claim 2 including applying a signal from an external source to the processor means to modify a processing algorithm of the processor means.

4. A method as defined in claim 2 including applying a varying signal from an external source to the processor means for modifying a processing algorithm of the processor means in real time therefrom.

5. A method as defined in claim 2 in which the processor means is comprised of a digital signal processor (DSP).

6. A method as defined in claim 2 in which the processor means is comprised of an adaptive filter.

7. An audio decoder comprising means for receiving digital frequency domain signal samples of an audio signal and for reconstructing subband data therefrom in accordance with a predetermined standard, means for increasing the resolution of the subband data, means for processing said subband data having increased resolution to obtain a processed frequency domain digital audio signal and means for constructing a time domain audio output signal from the processed digital audio signal, in which said processing means is an adaptive filter.

8. A decoder as defined in claim 7 in which the adaptive filter includes means for receiving a signal from an external source for modifying filter characteristics of the adaptive filter.

9. A decoder as defined in claim 7 in which said processing means is comprised of a digital signal processor.

10. A decoder as defined in claim 7 in which said means for processing subband data includes a control input, and means for applying a control signal to said means for processing for modifying a processing algorithm operated by said means for processing.

* * * * *